(12) United States Patent
Gabriel

(10) Patent No.: US 7,413,260 B2
(45) Date of Patent: Aug. 19, 2008

(54) MOTORIZED SPINNER FOR AUTOMOTIVE WHEELS

(76) Inventor: Rick A. Gabriel, 7270 Birdcherry St., Las Vegas, NV (US) 89148

( * ) Notice: Subject to any disclaimer, the term of this patent is extended or adjusted under 35 U.S.C. 154(b) by 0 days.

(21) Appl. No.: 11/234,129

(22) Filed: Sep. 23, 2005

(65) Prior Publication Data

US 2007/0069573 A1    Mar. 29, 2007

(51) Int. Cl.
*B60B 7/04*   (2006.01)

(52) U.S. Cl. ............................... 301/37.25; 301/37.108

(58) Field of Classification Search .............. 301/37.25, 301/37.101, 37.102, 37.108; 40/587
See application file for complete search history.

(56) References Cited

U.S. PATENT DOCUMENTS

| | | | |
|---|---|---|---|
| 1,739,577 A | 12/1929 | Cantu | |
| 3,548,185 A | 12/1970 | Hall | |
| 3,566,536 A | 3/1971 | Baynes et al. | |
| 3,611,601 A * | 10/1971 | Stropkay et al. | 40/587 |
| 3,722,958 A * | 3/1973 | Marshall | 301/37.25 |
| 4,900,095 A | 2/1990 | Brubaker | |
| 5,290,094 A * | 3/1994 | Gragg | 301/37.25 |
| 6,554,370 B2 | 4/2003 | Fowlkes | |
| 6,632,121 B2 | 10/2003 | Edmisson et al. | |
| 6,637,830 B1 | 10/2003 | Burgess | |
| 6,663,187 B2 | 12/2003 | Fitzgerald | |
| 6,702,395 B1 | 3/2004 | Wang | |
| 6,773,321 B1 | 8/2004 | Urquiaga | |
| 6,776,459 B2 | 8/2004 | Fitzgerald | |
| 7,100,995 B2 * | 9/2006 | Gilly et al. | 301/37.25 |
| 2005/0052069 A1 | 3/2005 | Gilly et al. | |
| 2005/0093362 A1 | 5/2005 | Alicea | |

* cited by examiner

*Primary Examiner*—Jason R Bellinger
(74) *Attorney, Agent, or Firm*—Myers & Kaplan; Sandra M. Drummond

(57) ABSTRACT

A motorized wheel spinner having a spinning wheel cover that is attached to a bushing on a shaft of an electric motor. The axis of the wheel, and thus also of the wheel axle, is coincident with the axis of the motor shaft and spinning cover. The motor can be disposed within a tubular axle, within the end of a solid axle, or, alternately, the case of the motor can comprise a surface upon which the wheel itself rotates. The motorized wheel spinner can be selectively rotated or stopped via a remote control.

8 Claims, 3 Drawing Sheets

MOTORIZED SPINNER FOR AUTOMOTIVE WHEELS

TECHNICAL FIELD

The present invention relates generally to spinners for automotive wheels, and more specifically to a motorized spinner for automotive wheels. The present invention may further be applied to model/toy vehicles.

BACKGROUND OF THE INVENTION

Automotive wheels have long been adorned with devices that provide an aesthetically-pleasing appearance. For instance, stamped, forged or cast steel wheels (sometimes called wheel rims, rims and/or hubs), wheel covers, or hubcaps, are utilized to enhance the wheel appearance, and may be plated with chromium to provide a bright, non-corroding, aesthetically-pleasing surface, or otherwise may be painted.

More advanced automotive wheel technology has provided wheels cast from aluminum or magnesium; thereby, providing a non-corroding bright polished finish that does not require further surface treatment. Additionally various creative styles of cast wheels, rims or hubs, in the shape of spokes or arms are available, and are popularly utilized to differentiate one owner's vehicle from that of another. Further, rotation of such spokes or arms provides a desired visual appearance of the wheel rotation.

Still even more complex wheel designs are available, most notably wheel spinners. Wheel spinners may resemble the spokes of the wheel/rim or other designs, but instead of being fixed like the actual spokes or arms, the spinner structure rotates on a bearing device, typically attached to the wheel via the existing wheel mounting studs and nuts. Thus, the wheel spinner is free to rotate, even if the underlying wheel is stationary. In use, due to low frictional forces within the bearings, rotation of the wheels during driving conditions causes rotation of the wheel spinner. Additionally, because the bearings have low friction, the wheel spinner continues with briefly-extended rotation once the wheel itself has come to a halt; thereby, providing a visually-pleasing appearance of continued wheel motion.

Unfortunately, available wheel spinners lack a means for continuous rotation during periods when the vehicle wheels are stationary; thus, when such wheel spinners eventually come to a halt, they no longer provide the desired "spinning" appearance. Even manually spinning the wheel spinner will result in only briefly-extended rotation due to the friction of the bearings on which the spinner is carried.

Moreover, although vehicles in motion may have active spinners, vehicles that are displayed at shows usually have stationary wheels and thus no rotation is imparted to the wheel spinner, rendering the spinner an undesirable non-moving wheel modification. Similarly, stationary model/toy vehicles may have spinners that can be briefly rotated, but again, frictional forces rapidly bring the rotating spinner to a halt.

Accordingly, various devices have be utilized in an attempt to overcome the lack of spinner rotation when a vehicle is stationary. These include remote control devices to activate rotation of the motorized wheels of display models, wherein the wheel is not in contact with a surface and thus can be otherwise freely rotated. Such motorized wheels thus cause rotation of the spinner via friction from the rotation of the wheels. However, the spinner cannot be selectively rotated independently from the wheel rotation.

In addition to the desired ability to rotate the spinner, it is further desirable that the spinner not add visual bulk to the wheel. That is, the spinner should lie as flat against the surface of the wheel as is possible to provide a relatively clean, flush appearance.

Therefore, it is readily apparent that there is a need for a motorized wheel spinner that can be remotely controlled by the vehicle owner and operated during periods of wheel rotation (such as when driving) and while the wheels are stationary.

BRIEF SUMMARY OF THE INVENTION

Briefly described, in a preferred embodiment, the present invention overcomes the above-mentioned disadvantages and meets the recognized need for such a device by providing a motorized wheel spinner suitable for use with automobiles and toy automobile models. The present invention comprises a motor with a rotating shaft disposed behind a vehicle wheel. Because the motor is located behind the wheel, it is not visible and does not add visual bulk to the wheel cover. Accordingly, the rotatable wheel cover can be disposed nearly flat against the wheel, providing the desired clean appearance of wheel rotation desired by the driver, even when the wheels are stationary.

According to its major aspects and broadly stated, the present invention in its preferred form is a motorized wheel spinner that can be selectively rotated or stopped via remote control. The axes of rotation of electric motors disposed behind the wheels of a vehicle are coincident with the axes of rotation of the wheel axles. The shafts of the motors extend through the wheels and rotate spinner covers that are secured to the motor shafts. The electric motors may be contained within various wheel axles, such as tubular axles or tubular portions of solid axles, or wherein the motor is affixed to the end of solid axles.

More specifically, the present invention is a motorized wheel spinner comprising a remote control transmitter activated by a vehicle driver, along with a receiver located proximate a motor/battery combination that activates an electric motor to rotate a wheel cover on demand. The motor comprises a shaft having its axis coincident with the axis of rotation of the wheel and its axle. The wheel cover is secured to the motor shaft via a bushing. A recharging receptacle is in communication with the battery, wherein a driver can periodically apply energy via the recharging receptacle to restore the battery to a charged condition.

Addition of motors to the wheel spinners, along with a remote control capability, permits a driver to selectively turn on/turn off the wheel spinner action. Placement of the motors such that their rotational axes are coincident with the wheel axles provides a single, generally-cylindrical drive unit that provides power to the wheels and contains the electric motors to drive the spinners. By incorporating batteries, recharging circuitry and remote control receivers within the spinner/motor combination, the wheel spinner becomes a self-contained unit, providing a clean appearance to the vehicle wheel. Accordingly, the present invention permits wheels to be powered by conventional axles, while providing independent spinner rotation via remote control.

The present invention can also be utilized as an aftermarket wheel spinner, wherein the wheel spinner comprises a mounting plate adapter to receive the studs of a wheel. In such an application, the motor is attached to the mounting plate. By maintaining the rotational axis of the motor/shaft coincident with the rotational axis of the wheel axle, the wheel spinner will be symmetrically disposed on the wheel, and will provide a smooth rotation and clean appearance. For model or toy automobiles, the electric motor can support a wheel on its motor case, wherein the wheel can rotate on bearings disposed on the motor case. In such an application, the shaft of the motor carries the wheel spinner thereon.

Accordingly, a feature and advantage of the present invention is its ability to provide a rotating wheel spinner when a wheel is stationary.

Another feature and advantage of the present invention is its ability to be remotely controlled.

Still another feature and advantage of the present invention is its ability to be retrofitted to existing wheels.

Yet another feature and advantage of the present invention is its ability to be accommodated within a tubular drive axle.

Yet still another feature and advantage of the present invention is that it can be externally recharged.

A further feature and advantage of the present invention is its ability to provide a bearing surface for wheel rotation.

These and other features and advantages of the present invention will become more apparent to one skilled in the art from the following description and claims when read in light of the accompanying drawings.

BRIEF DESCRIPTION OF THE DRAWINGS

The present invention will be better understood by reading the Detailed Description of the Preferred and Selected Alternate Embodiments with reference to the accompanying drawing figures, in which like reference numerals denote similar structure and refer to like elements throughout, and in which.

DETAILED DESCRIPTION OF THE PREFERRED AND SELECTED ALTERNATIVE EMBODIMENTS

In describing the preferred and selected alternate embodiments of the present invention, as illustrated in FIGS. 1-5, specific terminology is employed for the sake of clarity. The invention, however, is not intended to be limited to the specific terminology so selected, and it is to be understood that each specific element includes all technical equivalents that operate in a similar manner to accomplish similar functions.

Figure 1:
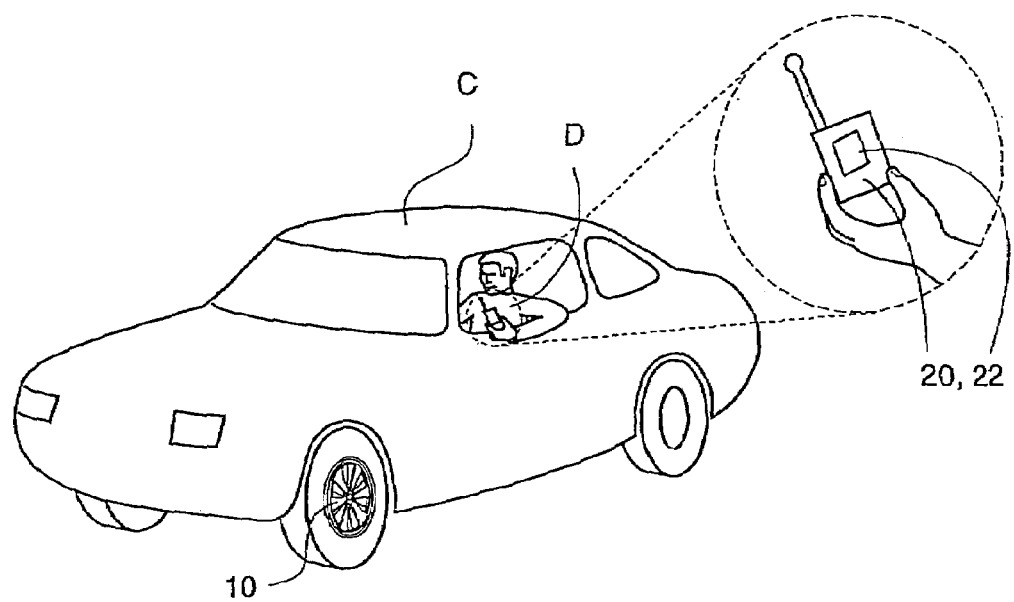
FIG. 1 is a perspective view of a vehicle equipped with a motorized wheel spinner according to a preferred embodiment of the of the present invention, shown operated via remote control by the vehicle driver.
Figure 2A:
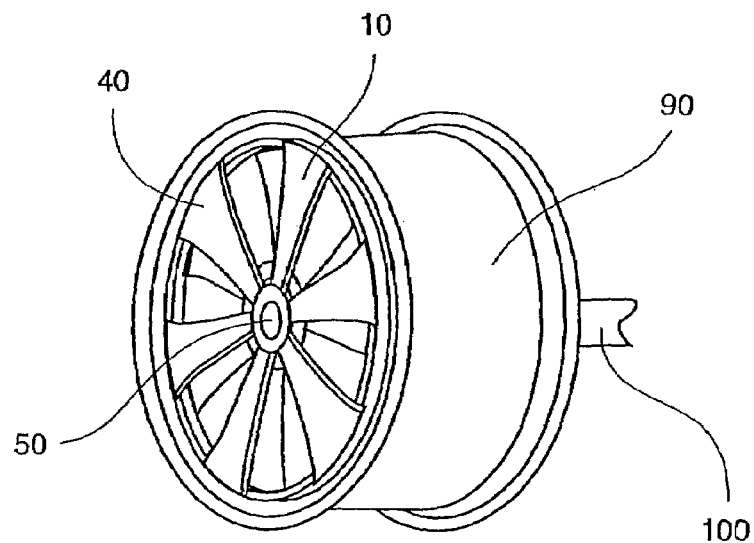
FIG. 2A is a perspective view of a motorized wheel spinner according to a preferred embodiment of the present invention.
Figure 2B:
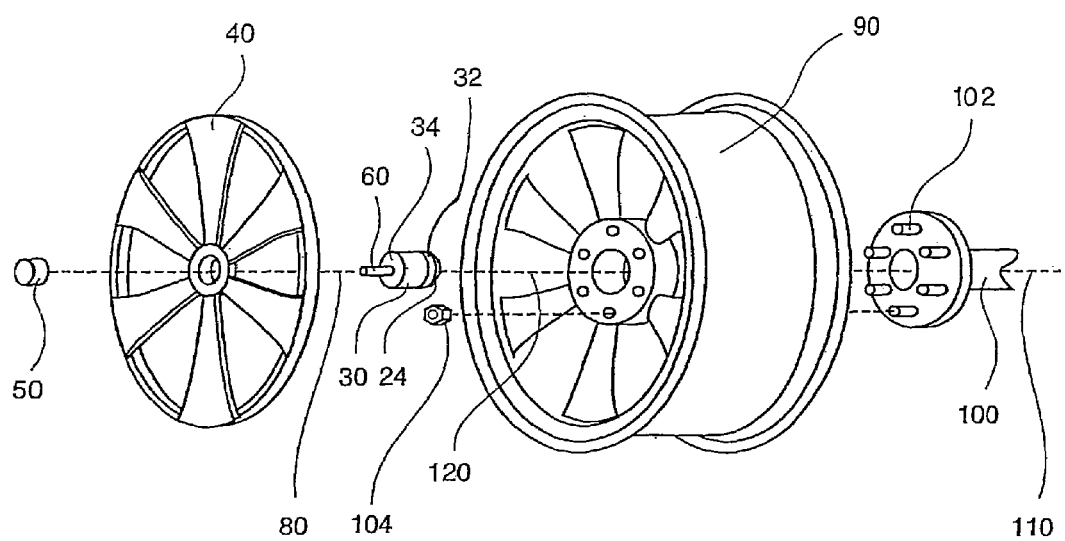
FIG. 2B is an exploded perspective view of the motorized wheel spinner of FIG. 2A.
Figure 3:
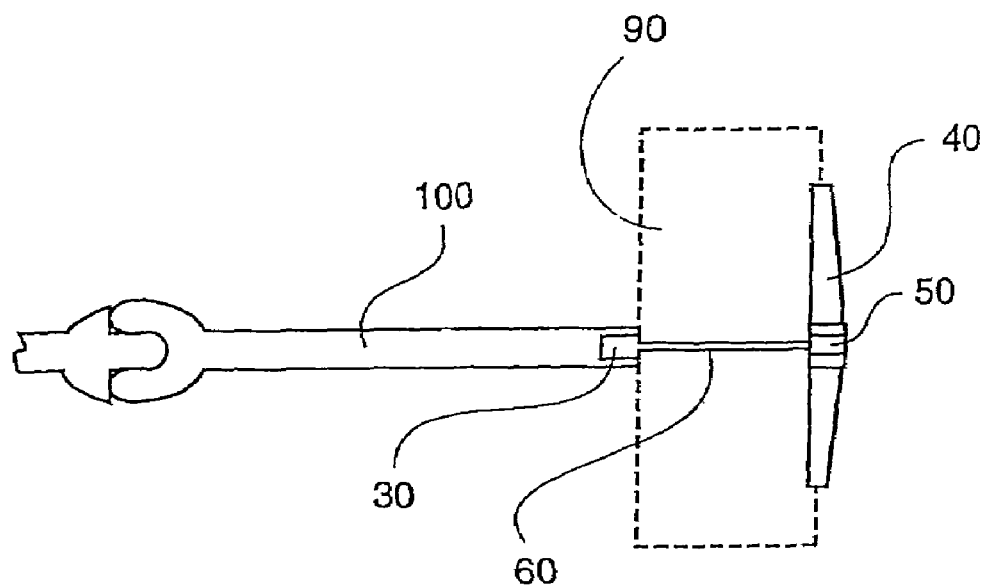
FIG. 3 is a cross-sectional view of a motorized wheel spinner according to a preferred embodiment of the present invention.

Referring now to FIGS. 1-3, the present invention in a preferred embodiment is motorized wheel spinner 10, wherein motorized wheel spinner 10 is preferably selectively rotated or stopped via remote control 20, wherein driver D of car C preferably activates remote control 20, and wherein remote control 20 comprises a transmitter 22 in communication with receiver 24. Motorized wheel spinner 10 preferably comprises motor 30, battery 32, recharge receptacle 34, cover 40 and bushing 50, wherein cover 40 preferably comprises a spoke-like appearance. It will be recognized by those skilled in the art that other appearances could be utilized. Motor 30 preferably comprises remote control receiver 24 and shaft 60, wherein cover 40 is preferably secured to shaft 60 via bushing 50, and wherein shaft 60 preferably comprises first axis 80.

Motor 30 is disposed such that first axis 80 of shaft 60 is coincident with axis of rotation 120 of wheel 90. Wheel 90 of car C is preferably driven via tubular axle 100, wherein tubular axle 100 is preferably in rotational communication with wheel 90. Those skilled in the art will recognize that any suitable means for coupling of tubular axle 100 to wheel 90 could be utilized to provide rotational communication between tubular axle 100 and wheel 90, such as, for exemplary purposes only, studs 102 and wheel nuts 104. Tubular axle 100 preferably comprises second axis 110, wherein tubular axle 100 is preferably adapted to receive motor 30 therewithin, and wherein second axis 110 of tubular axle 100 and first axis 80 of shaft 60 are preferably coincident.

In use, wheel spinner 10 is activated by driver D to selectively start/stop rotation of cover 40. When necessary, battery 32 is recharged by applying an energy source of the correct voltage and appropriate current/voltage control/limitation to receptacle 34, wherein receptacle 34 is in communication with battery 32. Once battery 32 is recharged, driver D can again energize wheel spinner 10.

Figure 4:
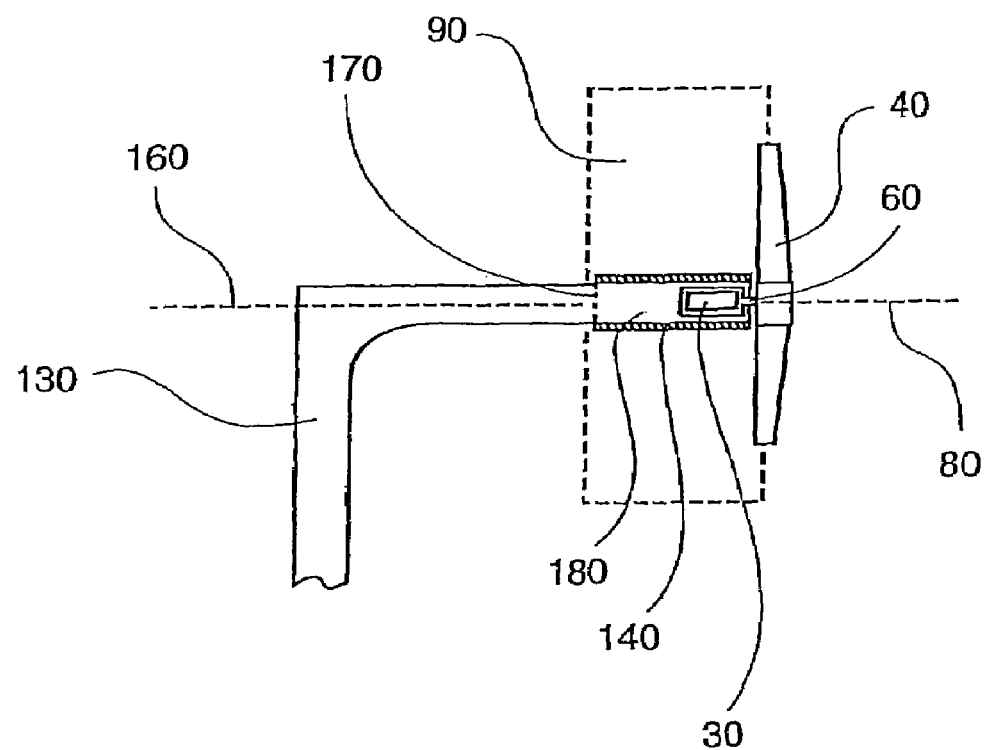
FIG. 4 is a cross-sectional view of a motorized wheel spinner according to an alternate embodiment of the present invention; and, FIG. 5 is an exploded perspective view of a motorized wheel spinner according to an alternate embodiment of the present invention.

Referring now more specifically to FIG. 4, illustrated therein is an alternate embodiment of device 10, wherein the alternate embodiment of FIG. 4 is substantially equivalent in form and function to that of the preferred embodiment detailed and illustrated in FIGS. 1-3 except as hereinafter specifically referenced. Specifically, the embodiment of FIG. 4 comprises support 130, motor 30, cover 40 and bearing 140, wherein motor 30 is carried by support 130, and wherein support 130 maintains motor 30 in a rigid disposition. Wheel 90 is disposed on motor 30 via bearing 140, wherein bearing 140 rotationally separates motor 30 and wheel 90, and wherein wheel 90 can rotate freely upon motor 30. First axis 80 of shaft 60 of motor 30 is coincident with second axis 160 of support 130. Motor 30 can alternatively be affixed to end 170 of support 130 or could be formed integrally, wherein case 180 of motor 30 could be machined from end 170 of support 130.

The embodiment of FIG. 4 may further be applied to model/toy vehicles with free running wheels 90, such as, radio-controlled cars, die-cast model cars or child-size toy vehicles, wherein motorized wheel spinner 10 can be rotated via remote control 20, while permitting free travel of a model vehicle via un-powered rotation of wheels 90.

Figure 5:
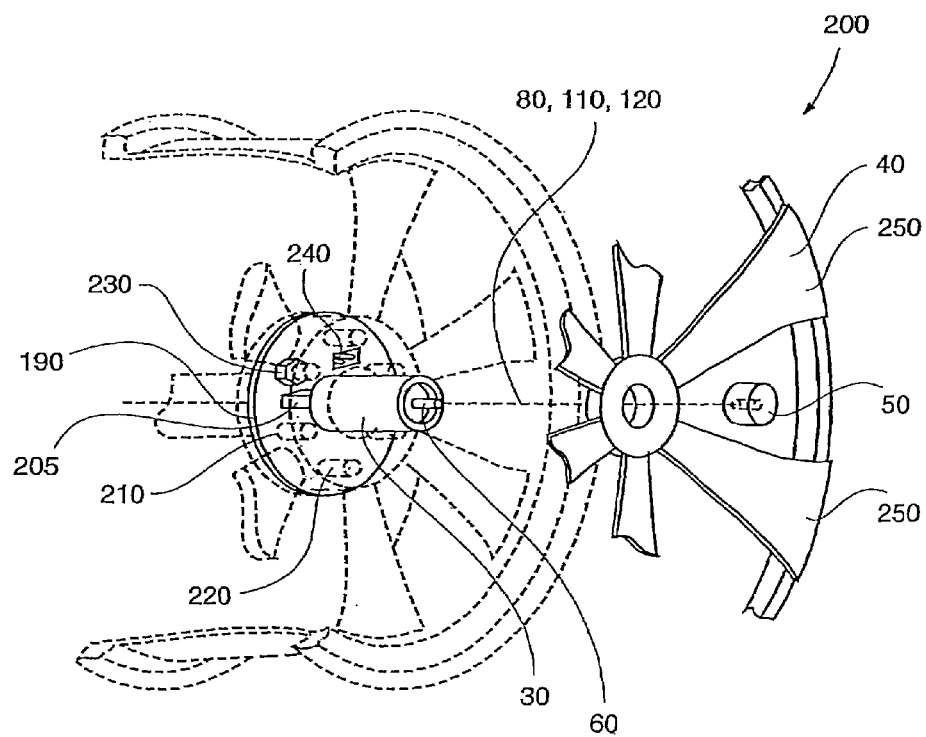

Referring now more specifically to FIG. 5, illustrated therein is an alternate embodiment of device 10, wherein the alternate embodiment of FIG. 5 is substantially equivalent in form and function to that of the preferred embodiment detailed and illustrated in FIGS. 1-3 except as hereinafter specifically referenced. Specifically, the embodiment of FIG. 5 can be retrofitted to existing wheels and, thus, comprises motorized wheel spinner 200, wherein motorized wheel spinner 200 comprises mounting plate 190, motor 30, battery 205, shaft 60, bushing 50, cover 40 and recharge receptacle 240. Mounting plate 190 comprises apertures 210 suitably spaced and suitably dimensioned to receive wheel studs 220 of mounting wheel 90. Upon insertion of wheel studs 220 into apertures 210, mounting plate 190 is secured via nuts 230. Recharge receptacle 240 is accessible between blades 250 of cover 40, wherein a suitable external power supply 260 (not shown) could be connected to recharge receptacle 240 to recharge battery 200.

In another embodiment of the present invention, it is envisioned that remote control 20 could be adapted to select an individual spinner or combination of spinners at the choice of driver D.

In yet another alternate embodiment of the present invention, it is envisioned that appropriate voltage/current control/limitation circuitry could be contained within recharge receptacle 34, 240 and disposed proximate to motor 30/battery 32, 205; thereby, only requiring the energy source be of adequate voltage to recharge battery 32, 205.

In still another alternate embodiment of the present invention, it is envisioned that motor 30 can be powered from the main electrical system of car C, wherein electrical feed to motor 30 could comprise a direct electrical communication or a commutating mechanism.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A motorized wheel spinner comprising:
   a motor comprising a shaft having a rotational axis;
   a spinner cover secured to said shaft;
   a wheel having a rotational axis, wherein said rotational axis of said wheel is coincident with said rotational axis of said motor shaft;
   a battery; and
   a recharging receptacle for recharging said battery.

2. The motorized wheel spinner of claim 1, wherein said motor is an electric motor.

3. The motorized wheel spinner of claim 1, wherein said motor is contained within an axle of said wheel, and wherein said axle rotates said wheel of a car.

4. The motorized wheel spinner of claim 3, wherein said axle comprises a tubular axle.

5. The motorized wheel spinner of claim 1, wherein said cover is secured with a bushing.

6. A motorized wheel spinner comprising:
   a motor comprising a shaft having a rotational axis;
   a spinner cover secured to said shaft;
   a wheel having a rotational axis, wherein said rotational axis of said wheel is coincident with said rotational axis of said motor shaft;
   wherein said motor comprises a support for rotation of said wheel thereon, wherein said motor further comprises a bearing and a case having said bearing disposed thereon, and wherein said wheel is disposed on said bearing as said support for rotation of said wheel.

7. A motorized wheel spinner comprising:
   a motor comprising a shaft having a rotational axis;
   a spinner cover secured to said shaft;
   a wheel having a rotational axis, wherein said rotational axis of said wheel is coincident with said rotational axis of said motor shaft; and
   a motor support member, wherein said motor is integrally formed within said motor support member.

8. A motorized wheel spinner comprising:
   a motor comprising a shaft having a rotational axis;
   a spinner cover secured to said shaft;
   a wheel having a rotational axis, wherein said rotational axis of said wheel is coincident with said rotational axis of said motor shaft,
   wherein said motor is affixed to an end of a wheel axle.

* * * * *